Figure 1:
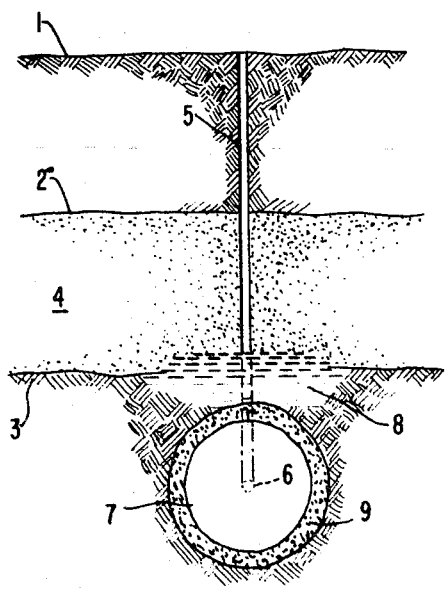

United States Patent

[11] 3,608,636

[72] Inventor Rod P. Dixon
 Salt Lake City, Utah
[21] Appl. No. 795,190
[22] Filed Jan. 30, 1969
[45] Patented Sept. 28, 1971
[73] Assignee American Oil Shale Corporation
 Salt Lake City, Utah
 Continuation-in-part of application Ser. No. 541,810, Apr. 11, 1966, now abandoned, and a continuation-in-part of 734,661, June 5, 1968.

[54] BENEFICIATION OF GEOLOGICAL FORMATIONS BY MEANS OF UNDERGROUND NUCLEAR DETONATIONS AND THE UTILIZATION OF WATER IN CONJUNCTION THEREWITH
 10 Claims, 4 Drawing Figs.
[52] U.S. Cl. ................................................ 166/247, 61/.5
[51] Int. Cl. ................................................ E21b 43/00
[50] Field of Search ........................................ 166/247, 299, 302; 61/.5

[56] References Cited
 FOREIGN PATENTS
 776,485  1/1968  Canada .................. 166/247

OTHER REFERENCES

Carlson:, " Constructing Underground Storage Facilities with Nuclear Explosives," The Petroleum Engineer, August, 1959, (pp. B34– 34).

Johnson et al.,: " Nonmilitary Uses of Nuclear Explosives," Scientific American, December 1958, Vol. 199, No. 6, pp. 29.

Wainerdi:, " Possible Use of a Nuclear Explosive For Stimulation of a Natural Gas Reservoir," Producers Monthly, August 1965, vol. 29, No. 8 (pp. 24– 25).

Primary Examiner—Stephen J. Novosad
Attorney—Burns, Doane, Benedict, Swecker & Mathis ABSTRACT: When a nuclear explosive device is detonated underground in a geological formation, an extraneous liquid such as water is introduced into the resulting fragmented area of the formation to upgrade the quality of fluid products withdrawn therefrom. For instance, water introduced into a chimney formed by underground nuclear detonation in a natural gas field may be used to remove water soluble radioactive contaminants from the gas to be produced from the formation. In another embodiment, the radioactivity of a water supply which is to be accumulated underground in a nuclearly detonated reservoir may be reduced to an acceptable level by introducing an initial volume of water into the fragmented formation about and above the point of detonation in an early stage of the accumulation process such that this water would scrub radioactive contaminants from the detonated formation and the contaminated water consequently accumulating in such early stage following detonation is removed before accumulation of substantially pure water is begun.

PATENTED SEP 28 1971 3,608,636

INVENTOR
ROD P. DIXON

BY
Burns, Doane, Benedict, Swecker & Mathis
ATTORNEYS

BENEFICIATION OF GEOLOGICAL FORMATIONS BY MEANS OF UNDERGROUND NUCLEAR DETONATIONS AND THE UTILIZATION OF WATER IN CONJUNCTION THEREWITH

CROSS-REFERENCE TO RELATED APPLICATIONS

This application is a continuation-in-part of copending applications Ser. No. 541,810, filed Apr. 11, 1966, now abandoned and Ser. No. 734,661, filed June 5, 1968.

BACKGROUND OF THE INVENTION

It is well known that a nuclear detonation underground will create a cylinder or roofed-over chimney filled with broken rock, normally with a void space at the top. This is brought about by a large, hot cavity filled with vaporized rock being created about the detonation point. The formation of the initial hot cavity as the vaporized mass expands following the shock wave and the subsequent and progressive caving of the cavity roof and the formation of the cylinder of fragmented rock are very well known and do not require further description. Such a cylinder of broken material contains chunks of fractured rock, which range randomly in size from sand grains to huge boulders. Normally, there is a permeability between 25 percent and 40 percent.

In such detonations radioactive elements are released in or as a result of the detonation and thereafter may impart excessive radioactivity to products which are to be removed from the formation. For instance, tritium that is released in the detonation of a thermonuclear device will tend to contaminate natural gas that one may wish to recover from such a formation. The contamination may be due to tritium in molecular form being mixed into the natural gas originally present in the formation, or at the very high temperatures which immediately follow a thermonuclear detonation the tritium released may progressively become part of at least some of the hydrocarbon molecules present by interchange with their original ordinary hydrogen atoms, or the tritium released in the detonation may become converted to tritium oxide or tritiated water by combining with oxygen that may have been initially present in the formation of the form of air or otherwise in molecular form or that may have been released by the detonation causing disassociation of any of a number of mineral oxides commonly present in the earth.

Other undesirably radiation products having a long-half life, such as radioactive strontium, may also be formed in the formation of a result of a nuclear detonation and cause contamination of products to be recovered from such a fracture formation.

If water is present or subsequently enters a nuclearly detonated formation containing tritiated water or other water soluble radioactive detonations products, the water itself then becomes excessively radioactive and unfit for inclusion in municipal water supplies or for other purposes where its radiation may constitute an impermissible health hazard.

OBJECTS

It is a broad object of this invention to provide a method for minimizing the hazards of radioactive contamination which attend the fragmentation of geological formations by underground nuclear detonations.

A more particular object is to minimize the contamination of economically useful mineral fluids such as natural gas or water which are to be recovered from a geological formation that has been fractured with the aid of a nuclear explosive device, and particularly a thermonuclear device.

Another object is to reduce or eliminate the need for delaying product recovery from a nuclearly detonated formation until after the radiation level drops to an acceptable value by natural decay, or to minimize the need for removing radioactive contamination from fluid products after their recovery from a nuclearly detonated formation.

A more specific object is to scrub radioactive matter such as tritium or tritium compounds from a nuclearly fractured formation.

Another specific object is to create a nuclear cavity relatively free from radioactive contamination.

A still further specific object is to permit the recovery of fluid hydrocarbons from a nuclearly fractured formation after they have been freed from undesirable radioactivity or after their radioactivity has been reduced to an acceptable level.

These and other objects, as well as the nature, scope, utility and mode of operation of the invention will become more clearly apparent from the subsequent description and the attached drawings.

SUMMARY

The present invention provides a process for reducing the radioactivity of a nuclearly fractured underground formation by introducing above the point of nuclear detonation a volume of water or other liquid in which an unwanted radioactive contaminant is soluble, whereby the contaminant is scrubbed out and, if desired, can be pumped out with the added liquid. More particularly, by placing a wash liquid such as water at an appropriate level in the formation prior to the nuclear detonation, the added liquid or the formation which is impregnated with such liquid will absorb the radiation products when the formation collapses into the detonation cavity and carry the radiation products to the bottom of the fractured formation or chimney whence the resulting radioactive solution is pumped out or otherwise mechanically removed for safe disposal while the desired useful fluid such as natural gas is recovered separately from the contaminants.

When a nuclearly created cavity or chimney is to be used as an underground reservoir for water or some other fluid such as natural gas that is to be recovered later, the scrubbing of such a cavity or chimney with water which is then pumped out in an early stage after a nuclear detonation while containing a relatively high concentration of radioactive contaminants makes possible the subsequent accumulation and ultimate recovery of relatively uncontaminated product fluid from such a reservoir.

IN THE DRAWINGS

FIG. 1 is a vertical section through a mineral formation in which a nuclear entry hole has been drilled; a nuclear explosive device has been placed and freshly detonated; and water has been forced into the formation above and around the nuclear device and prior to the detonation thereof for the purpose of absorbing and scrubbing radioactive contaminants from the gas phase following the detonation.

Figure 2:
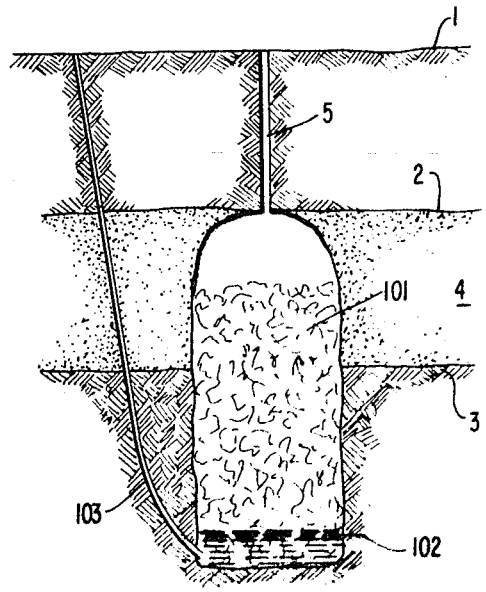

FIG. 2 is a vertical section through the same formation shown in FIG. 1 but at a time substantially subsequent to the detonation. The nuclearly detonated chimney is shown fully formed, with the water present in the formation prior to the detonation being collected at the bottom thereof, after intervening vaporization, condensation, and percolation downward, and ready for withdrawal through a recovery well.

GENERAL DESCRIPTION

The production of minerals in situ from an underground deposit has obvious advantages over the conventional processes employing mining, breaking, surface treatment and further refining when necessary. The use of nuclear explosive devices has a represented major step forward in this connection. However, such use of nuclear explosives, and especially the use of thermonuclear explosives, tends to release in the detonated formation radioactive substances which may cause the products withdrawn from such a formation to be injuriously radioactive and not suitable for use until such excessive radioactivity is reduced therein to a permissible level either by suitable treatment or by radioactive decay which occurs when sufficient time is allowed to elapse before the desired products are withdrawn from a nuclearly detonated formation. As has been heretofore described by F. W. Stead, Science, Nov. 29, 1963, vol. 142, No. 3596, pages 1163–1165, the underground explosion of a fusion device which is triggered by a small fission device produces a considerably amount and variety of radioactive nuclides. However, most of these nuclides are relatively shortlived and their activities decrease rapidly such that at the end of one year they become insignificant in terms of recognized biological importance, and only the longer-lived radionuclides remain to be seriously reckoned with. Among these, the most important ones are $H^3$ (tritium), $Sr^{90}$ and $Cs^{137}$. $C^{14}$, while being relatively long-lived, is usually formed in only a very low amount in an underground explosion because this nuclide is induced by neutron reaction with $N^{14}$, and nitrogen is normally lacking in an underground formation. $Cs^{137}$ also usually should not be of major significance because it tends to be relatively firmly held in the solid geologic environment by exchange mechanisms. This leaves tritium, $Sr^{90}$ and, to some extent $Co^{60}$ as the radionuclides that are most apt to be the cause of radioactive contamination in fluids removed from a nuclearly detonated formation.

In a nonventing underground explosion, essentially all tritium would rapidly form tritiated water, either by oxidation or exchange, and tritium exchange between the tritiated water and the rock matrix should be negligible. The resulting tritiated water would, of course, become mixed with other underground water and impart radioactivity to it as well as to any gaseous product which may be withdrawn from such a formation after becoming saturated or charged with vapor from the radioactive water present or formed in such a formation. Additional contamination of water in such a formation would result from the solution of the radioactive strontium and cobalt in the water.

As an example, Stead, op. cit., has calculated the distribution of tritium and other radionuclides in ground water around a large underground fusion explosion, and more particularly around a 1-megaton fusion explosion triggered by a 10-fission explosion. In making these calculations, it was assumed that the explosion is contained underground in the sense that the fireball and direct neutron flux does not reach the atmosphere; the explosive device is surrounded by borated materials which capture neutrons without producing radioactivity; and the environment in which the explosion occurs consists of average crustal materials (such as dolomite or similar carbonate rock) with a porosity of 20 percent by volume and saturated with water.

The reaction products calculated for such an underground explosion are shown in table I.

TABLE I

Reaction Products From Underground Explosion

| Source | Fission products (curies) | Induced products (curies) | Fusion products (curies) |
| --- | --- | --- | --- |
| Fission (10 KT) | $3.0 \times 10^{9}$ | $10^5$ | |
| $Sr^{90}$ | $1.5 \times 10^3$ | | |
| $Cs^{137}$ | $1.6 \times 10^3$ | | |
| $C^{14}$ | | negligible | |
| Fusion (1 MT) | | $10^8$ | |
| $H^3$ | | | $6.7 \times 10^6$ |
| $C^{14}$ | | 15 | |

As has already been mentioned, the amount of radiocarbon is shown to be insignificant and $Cs^{137}$, while significant in amount, may nevertheless be disregarded because of its firm retention in the surrounding solid. The radioactive cobalt is also disregarded because, as shown by Stead, is concentration in the water present is approximately three orders of magnitude less than the maximum permissible concentration recommended for drinking water.

The distribution of $H^3$ and $Sr^{90}$ can, of course, be calculated for any given case. For instance, in nonventing underground explosion consisting of 1 megaton of fusion energy release and 10 kilotons of fission release in a dolomite rock should produce the following effects: (i) a vaporized cavity radius of about 110 meters, (ii) a crushed zone surrounding the cavity with an outer limit having a radius of about 230 meters, (iii) a grain density of the dolomite of 2.8 and its porosity (water saturated) of 0.05 (5 percent by volume). The radionuclides can be assumed to be distributed only in the crushed zone by direct explosive action, and post-explosion collapse of the crushed zone into the cavity does not effect the nuclide distribution.

In such a system, the mass of solids in the crushed zone will be 114 million metric tons, the mass of water in the pore space will be 2.1 million metric tons, and the total mass will be about 116 million metric tons. $^{11}$c./g.

Assuming that $Sr^{90}$ is all soluble and uniformly distributed throughout the dolomite in the crushed zone, its initial concentration in the total mass of the crushed zone will be 1,500 curies $Sr^{90}$ in $1.16 \times 10^{14}$ g, or $1.29 \times 10^{11}$ $^{11}$c./g.

When equilibrium is reached in the exchange of $Sr^{90}$ between the dolomite matrix and the contained pore water, the amount of $Sr^{90}$ in the water is expressed by the equation $$K_d = \frac{\text{Activity-solid}}{\text{Activity-water}} \times \frac{\text{Volume-water}}{\text{Weight-solid}}$$

where $K_d$, the distribution coefficient for dolomite, is 10. The $Sr^{90}$ activity in the water is then 2.8 curies; and the $Sr^{90}$ concentration in the water, 2.8 curies in $2.1 \times 10^{12}$ ml., is then $1.33 \times 10^{12}$ c./ml.

The minimum permissible concentration (on the basis of a 168-week for $Sr^{90}$ in water is $1 \times 10$ $^1$c./ml., so that the initial $Sr^{90}$ concentration in the contained pore water in this example would be about the same as the recommended minimum permissible concentration. Of course, depending on the concentration of clay minerals and other impurities in the dolomite, the $Sr^{90}$ concentration in the water could be higher or lower than has been calculated for the "average" dolomite selected. Relatively impure dolomites would tend to lead to a lower $Sr^{90}$ concentration, whereas pure dolomites, with relatively large amounts of calcium and magnesium ions in the pore water, would tend to lead to considerably higher $Sr^{90}$ concentrations in water than shown in the above calculation.

Similarly the tritium concentration in the pore water in the above case which has been chosen as an example would be $6.7 \times 10^6$ curies $H^3$ in $2.14 \times 10^{12}$ ml., or $3.1 \times 10^1_6$ c./ml. The maximum permissible concentration (168-hour week) for $H^3$ in water is $3 \times 10^1_8$ c./ml., so that the $H^3$ concentration in the water (about 1,700 acre-feet, or $2 \times 10^6$ m.$^3$) in the crushed zone in the selected example is two orders of magnitude higher than the recommended maximum permissible concentration and obviously would constitute a highly undesirable health hazard.

In accordance with the present invention, the previously mentioned disadvantage of radioactivity is overcome by deliberately conducting extraneous water into the formation in an area above, and directly about, the point where the nuclear explosive device is to be detonated, although care is taken to keep the functioning mechanism of the device itself dry so as to assure its proper operation. The water is introduced in an amount sufficient to reduce the radioactivity in the water solution after the nuclear explosion below a predetermined level. The resulting dilution may be such that the diluted solution is directly suitable for its intended use. Preferably, however the radioactive water solution first formed after the explosion is pumped out for safe disposal elsewhere so as to permit the subsequent accumulation of only lightly active fluid in the broken formation.

For instance, when a nuclear fusion device is to be used to increase the permeability of a natural gas field, an entry hole is drilled in the field to the desired depth at which the device can be exploded without venting to the atmosphere. Thereafter, at a level somewhat above the anticipated location of the sintered layer of mineral which will result from the nuclear detonation, and also about the nuclear device, the necessary amount of water is injected; it may be pressurized in the formation as is otherwise done in conventional water fracturing operations. As an alternative, extraneous water may be introduced into the broken formation after the nuclear detonation through the nuclear entry well or other suitably located hole.

The invention will be further described in terms of particular illustrative examples.

EXAMPLE 1

In this example the invention is used to reduce the radioactivity of a natural gas field in which a thermonuclear explosion is used for stimulation or for increasing its permeability.

More particularly, referring to FIG. 1, the formation being treated consists of country rock which extends from the earth surface 1 to a depth indicated by 2, below which is the gas-bearing stratum 4 which extends to a depth of about 2,800 feet, with lean rock therebelow.

A 50 kiloton thermonuclear device 6 is placed in this formation through nuclear entry well 5 at a depth of about 3,100 feet below the surface. A supply of fracturing water 8 is injected into this formation at a level about 2,800 feet below the surface in an otherwise conventional manner so that the water would extend laterally from the well preferably to a distance at least equal to the diameter of the cylinder to be created by the subsequent detonation, e.g., radially to an extent of about 135 feet to 150 feet from the well. If desired, such water fracturing may be conducted at more than one depth to make certain that an adequate supply of water is available in the formation to accomplish the desired scrubbing and absorption of radioactive contaminants. Of course, after one such detonation has been conducted in a given formation, the amount of water necessary for the scrubbing and absorbing operation in a subsequent shot can be predicted more accurately. It should be understood that when water is referred to in connection with such a fracturing operation, various previously known thickening agents, propping agents such as sand and other desired additives may be included therein in accordance with conventional fracturing practice.

Instead of introducing the required water into the formation by a water fracturing operation, when an adequate supply of water is available either at the surface or in the form of a subterranean aquifer, this water may be used for the underground scrubbing and absorbing operation by tapping it so that it would flow to the location in the formation where it is needed, or a combination of such tapping and water fracturing can be used.

In conjunction with such water fracturing or other water insertion step, but usually subsequent thereto, a nuclear device 6 of the proper size is introduced through the well 5, preferably after casing or otherwise sealing the latter so that the device may be inserted and maintained substantially dry until the time of detonation.

As shown in FIG. 2, after the nuclear device is detonated in such an arrangement the supply of water 8 which has been inserted or otherwise suitably channeled in the formation as shown in FIG. 1, drops down to form an aqueous layer 102 in the vicinity of the point of detonation as the fractured formation settles down into the nuclearly created cavity 7 (FIG. 1) and forms the type of cylinder or chimney of nuclearly broken rock 101 as is otherwise well known in the art. To keep product contamination at a minimum and also to reduce the risk of unintentionally contaminating any subterranean aquifers that may be present in such a formation, it is preferably to sink a recovery well 103 to the bottom of the fractured cylinder so that the contaminated water or other liquid accummulated therein as shown at 102 may be pumped to the surface for appropriate safe disposal. Gas products relatively free from radioactive contaminants may be then withdrawn from an upper portion of the cylinder through a gas recovery well which may be the same as the original nuclear entry well 5.

EXAMPLE 2

As a variation of the operation just described, this invention may be used to create an underground reservoir for water which may be subsequently included in a municipal water supply or for any other purposes without causing any undesirably radiation hazard. In such an embodiment, a nuclear explosive device 304 is detonated under nonventing conditions beneath an aquifer 303 which tranverses the formation, as schematically shown in FIG. 3. For maximum scrubbing effect, the distance between the point of detonation of the nuclear device 304 and aquifer 303 hereabove should be such that the aquifer shall be above the highest point through which the sintered layer, such as layer 9 in FIG. 1, of the nuclear cavity passes after the nuclear detonation and prior to cave-in of the fragment formation thereabove. As a result, when the nuclearly detonated cylinder of fragmented rock (analogous to cylinder 101 shown in FIG. 2) is formed under such conditions, the water from the aquifer 303 descends through the cylinder scrubbing radioactive contaminants such as tritiated water as well as other water soluble contaminants and radioactive dust particles and collects at the bottom of the cylinder. After the detonation a recovery well, analogous to well 103 shown in FIG. 2, is then drilled to extend to the bottom part of the cylinder and the contaminated water accumulating therein is then pumped out and its radioactivity checked by a Geiger counter or other appropriate, well-known means. When the radioactivity in the withdrawn water has dropped to an acceptable level, the pumping may be stopped and pure water allowed to accumulate in the cylinder for subsequent withdrawal as and when needed. It is particularly desirable to pump the contaminated water from the cylinder at a rate grater than the downward flow of water in the cylinder, so that the contaminated water may be substantially completely deplete from the cylinder and accumulation of pure water therein may be begun at a relatively early time after detonation.

The scope of the invention is more particularly pointed out in the appended claims.

1. In a process for fragmenting and beneficiating a geological formation by an underground nuclear explosion which is set off under nonventing conditions and whereby a roof topped, underground chimney of fragmented rock is formed with a gas phase in the void spaces in the chimney and whereby radioactive contaminants are released in the formation, the improvement which comprises introducing extraneous liquid into the formation above the detonation point such that the liquid after the explosion and consequent chimney formation descends downwardly through the fragmented formation, scrubs radioactive contaminants therefrom and collects at a lower portion of said chimney, and decontaminating said fragmented formation for further use by mechanically removing said contaminant-containing liquid therefrom separate from decontaminated mineral product.

2. A process according to claim 1 wherein the extraneous liquid is water, the explosion is a fission explosion and the resulting contaminants comprise radioactive strontium in water-soluble form.

3. A process according to claim 1 wherein the extraneous liquid is water, the explosion is a fusion explosion and the resulting contaminants comprise tritiated water.

4. A process according to claim 3 wherein the extraneous water is introduced into the formation prior to said explosion at a location which is above the point of detonation and within that portion of the formation which becomes fragmented by said explosion.

5. A process according to claim 3 wherein the extraneous water is conducted to an upper portion of said chimney of fragmented rock subsequent to the explosion.

6. In a process wherein an underground reservoir for water having an acceptable radioactivity level is created by a subterranean nuclear detonation in a geological formation which is traversed by a subterranean aquifer and wherein radioactive contaminants are released by said detonation, the improvement which comprises placing a nuclear explosive in said formation at a depth sufficient to avoid venting to the atmosphere and such that upon detonation of the explosive and creation of a nuclear cavity prior to formation cave-in said aquifer is located above said cavity, detonating said explosive and thereby causing fragmentation of the formation thereabove and formation of a cylinder of permeable broken rock with a gas phase between the broken rock extending from the point of detonation up into said aquifer, whereby water from the aquifer descends through said cylinder scrubbing the said gas phase and accumulating in a lower portion thereof, drilling a recovery well from the surface to where said water and radioactive contaminants contained therein accumulate, pumping said accumulated contaminated water from said cylinder until the radiation level of the removed water drops below a predetermined acceptable value, and thereafter accumulating acceptably pure water in said cylinder for later recovery.

7. A process according to claim 6 wherein contaminated water is pumped from the cylinder at a greater rate than water from the aquifer descends through the cylinder, whereby the contaminated water is substantially depleted from the cylinder before acceptable pure water is permitted to accumulate therein.

8. In a process for fragmenting a natural gas bearing geological formation by an underground nuclear explosion which is set off under nonventing conditions and produces a roof-topped underground chimney of rock fragments with a gas phase in the void spaces therebetween and releases radioactive contaminants in the formation, the improvement which comprises:

introducing liquid into the formation above the explosion point such that the liquid after the explosion and consequent chimney formation descends downwardly through the formation, scrubs radioactive contaminants therefrom and accumulates at a lower portion of said chimney, and removing natural gas relatively free from radio-active contaminant from an upper portion of the formation after the formation has been fragmented and the gas therein has been scrubbed with said descending liquid.

9. A process according to claim 8 wherein the extraneous scrubbing liquid is water.

10. A process according to claim 8 wherein the contaminants contain tritium, the extraneous scrubbing liquid is water, and the accumulated contaminant-containing water is removed from the formation for safe disposal at the surface separate from the natural gas product.